(No Model.)
C. F. LINSCOTT.
Glass Plate Cleaner.
No. 229,430. Patented June 29, 1880.
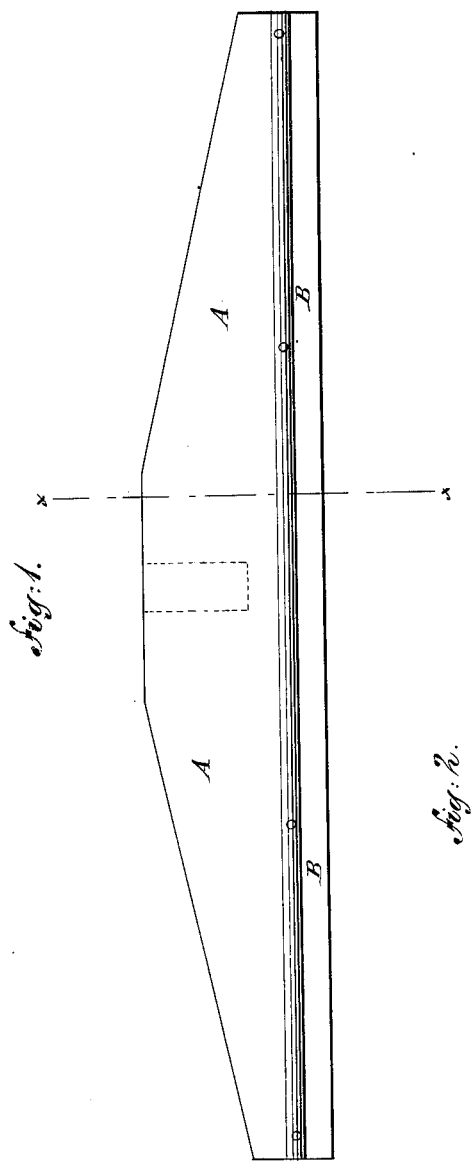
WITNESSES:
INVENTOR:
C. F. Linscott
BY Munn & Co
ATTORNEYS.

UNITED STATES PATENT OFFICE.

CHARLES F. LINSCOTT, OF BOSTON, MASSACHUSETTS.

GLASS-PLATE CLEANER.

SPECIFICATION forming part of Letters Patent No. 229,430, dated June 29, 1880.

Application filed April 26, 1880. (No model.)

*To all whom it may concern:*

Be it known that I, CHARLES F. LINSCOTT, of Boston, in the county of Suffolk and State of Massachusetts, have invented a new and useful Improvement in Glass-Plate Cleaners, of which the following is a specification.

Figure 1 is a front elevation of the improvement. Fig. 2 is a sectional elevation taken through the line $x\,x$, Fig. 1. Fig. 3 is a sectional elevation of the rubber strip enlarged.

The object of this invention is to furnish cleaners for windows, show-cases, and other glass plates and smooth surfaces so constructed as to adjust themselves to all inequalities of the surface and leave the said surface dry.

The invention consists in constructing a glass-plate cleaner of a head or holder and one or more rubber strips made thicker at one edge, with one side flat and the other side concaved from the thicker edge to, or nearly to, the thinner edge, as will be hereinafter fully described.

Similar letters of reference indicate corresponding parts.

A represents the head-block or holder, which may be made of wood or other suitable material, and of any desired shape or size.

B is the rubber plate, which is molded in strips of the desired size. The rubber B is made thicker at one edge than at the other, and with one side flat and the other side concaved from the thicker edge to, or nearly to, the thinner edge, as shown in Fig. 3. The thin edge of the rubber strip B is inserted in a groove in the face of the block or holder A, and is secured in place by nails or other suitable means. I prefer to attach two strips, B, to the block A, in which case the said strips B are placed parallel with each other, and with their flat sides inward or toward each other, as shown in Fig. 2. The part of the block A between the rubber strips B is made a little higher than the parts at the outer sides of the said strips B, for the said strips to bend over when the cleaner is in use. With this construction, when the cleaner is drawn over a glass plate the strip B, being used, will be bent over the part of the block A behind it, which causes the edge of the strip to project so that it will adjust itself to every inequality in the surface of the glass and remove all the water, leaving the surface perfectly dry.

In making the rubber strips B, I prefer to apply a strip of cloth to the flat side of the said strips to strengthen the said flat side, so that when the cleaner is being used the yield may be upon the forward or concave side of the strip, which brings the working edge into a more favorable position and prevents the said strips from stretching too much.

Having thus fully described my invention, I claim as new and desire to secure by Letters Patent—

1. A glass-plate cleaner, constructed substantially as herein shown and described, consisting of the head or holder A and one or more rubber strips, B, made thicker at one edge, having one side flat and the other side concaved from the thicker edge to, or nearly to, the thinner edge, as set forth.

2. In a glass-plate cleaner, the rubber strip B, made thicker at one edge, with one side flat and with its other side concaved from the thicker edge to, or nearly to, the thinner edge, substantially as herein shown and described, whereby the strip will adjust itself to every inequality in the surface of the glass and leave the said surface entirely dry, as set forth.

3. In a glass-plate cleaner, the combination, with the grooved face of the head or holder A, of one or more rubber strips, B, made thicker at one edge, with one side flat and the other side concaved from the thicker edge to, or nearly to, the thinner edge, substantially as herein shown and described, whereby the working edge of the rubber strip B, when the cleaner is in use, will be made to adjust itself to every inequality in the surface to which it is applied, as set forth.

CHARLES F. LINSCOTT.

Witnesses:
E. G. RIDEOUT,
WM. APGAR.